US008782251B2

(12) United States Patent
Girolamo et al.

(10) Patent No.: US 8,782,251 B2
(45) Date of Patent: Jul. 15, 2014

(54) AUTOMATED CONFIGURATION OF NETWORK MODE

(75) Inventors: Anthony Joseph Girolamo, Seattle, WA (US); Scott David Hoogerwerf, Seattle, WA (US); Vikram Kakumani, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 680 days.

(21) Appl. No.: 12/038,786

(22) Filed: Feb. 27, 2008

(65) Prior Publication Data

US 2009/0213758 A1    Aug. 27, 2009

(51) Int. Cl.
*G06F 15/16* (2006.01)

(52) U.S. Cl.
USPC ............................ 709/227; 709/202; 709/203

(58) Field of Classification Search
USPC .......................................... 709/202, 203, 227
See application file for complete search history.

(56) References Cited

U.S. PATENT DOCUMENTS

| 6,961,762 | B1 | 11/2005 | Yeap et al. | |
|---|---|---|---|---|
| 6,985,750 | B1 | 1/2006 | Vicknair et al. | |
| 7,218,930 | B2 | 5/2007 | Ko et al. | |
| 7,275,176 | B2 | 9/2007 | Stone-Kaplan et al. | |
| 7,310,664 | B1 * | 12/2007 | Merchant et al. | 709/220 |
| 7,783,733 | B1 * | 8/2010 | Yip et al. | 709/223 |
| 2004/0088397 | A1 * | 5/2004 | Becker et al. | 709/223 |
| 2004/0264395 | A1 | 12/2004 | Rao | |
| 2005/0152380 | A1 * | 7/2005 | Lee et al. | 370/401 |
| 2005/0260996 | A1 * | 11/2005 | van de Groenendaal | 455/445 |
| 2005/0273513 | A1 | 12/2005 | Panasyuk et al. | |
| 2006/0173844 | A1 | 8/2006 | Zhang et al. | |
| 2007/0199066 | A1 | 8/2007 | Smith et al. | |
| 2007/0208937 | A1 | 9/2007 | Cam-Winget et al. | |
| 2007/0258415 | A1 | 11/2007 | Lu et al. | |
| 2009/0164853 | A1 * | 6/2009 | Gokhale et al. | 714/57 |

FOREIGN PATENT DOCUMENTS

| CN | 1627836 | * | 6/2005 |
|---|---|---|---|
| WO | WO2007001121 A1 | | 1/2007 |

OTHER PUBLICATIONS

Dellinger, et al., "Network Architecture and support Services for Reconfigurability", Wireless World Research Forum, 2004, pp. 52.
"Centralized Visibility and Control Network Management Software for Configuring, Monitoring and Troubleshooting Enterasys Security-enabled Infrastructure Solutions", Enterasys Networks, 2007, pp. 3.

* cited by examiner

*Primary Examiner* — John Follansbee
*Assistant Examiner* — Glenford Madamba
(74) *Attorney, Agent, or Firm* — Jim Sfekas; Kate Drakos; Micky Minhas

(57) ABSTRACT

Aspects of the subject matter described herein relate to a mechanism for seamlessly changing a network mode of a network device that is connected to multiple nodes. In aspects, agents reside on the nodes. A master agent communicates with the other agents and receives the capabilities of the nodes on which they execute. The master agent creates a data structure that includes the settings needed to connect using the new network mode. The master agent distributes this data structure to the other agents and each agent stores settings associated with the current network mode in case a rollback is needed. The master agent then instructs the other agents to begin communicating using the new network mode and the network device is reconfigured. If the master agent does not receive success acknowledgments from all of the other agents, the master agent initiates a rollback procedure.

20 Claims, 6 Drawing Sheets

AUTOMATED CONFIGURATION OF NETWORK MODE

BACKGROUND

Wireless devices may connect to a wireless network through the use of a wireless access device. Vendors have created many wireless access devices that allow users to connect wireless devices. Most of these wireless access devices come with a default security setting of no security. When an unsophisticated user sets up a wireless network with one of these devices, the user often leaves the security settings at their default setting of no security.

When a user learns of the security risk posed by this default setting, the user may configure the wireless access device into a secure mode. Unfortunately, this has the effect of disconnecting all the wireless devices that are currently connected to the wireless access device. To reconnect the devices, the user may go from device to device and enter security settings so that the devices can securely connect to the reconfigured wireless access device. This is cumbersome and error-prone.

SUMMARY

Briefly, aspects of the subject matter described herein relate to a mechanism for seamlessly changing a network mode of a network device that is connected to multiple nodes. In aspects, agents reside the nodes. A master agent communicates with the other agents and receives the capabilities of the nodes on which they execute. The master agent creates a data structure that includes the settings needed to connect using the new network mode. The master agent distributes this data structure to the other agents and each agent stores settings associated with the current network mode in case a rollback is needed. The master agent then instructs the other agents to begin communicating using the new network mode and the network device is reconfigured. If the master agent does not receive success acknowledgments from all of the other agents, the master agent initiates a rollback procedure.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
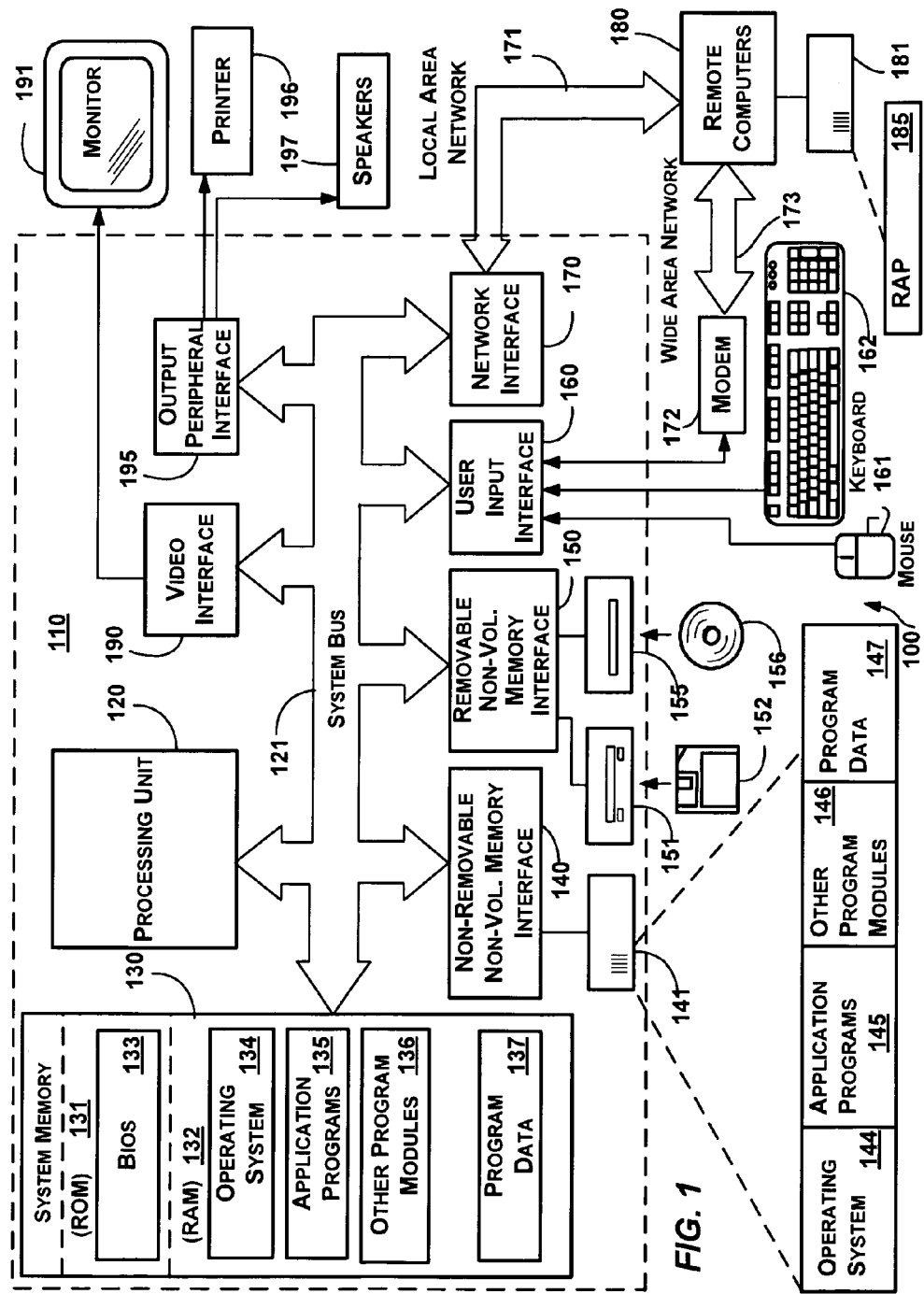
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Automated Configuration

Figure 2:
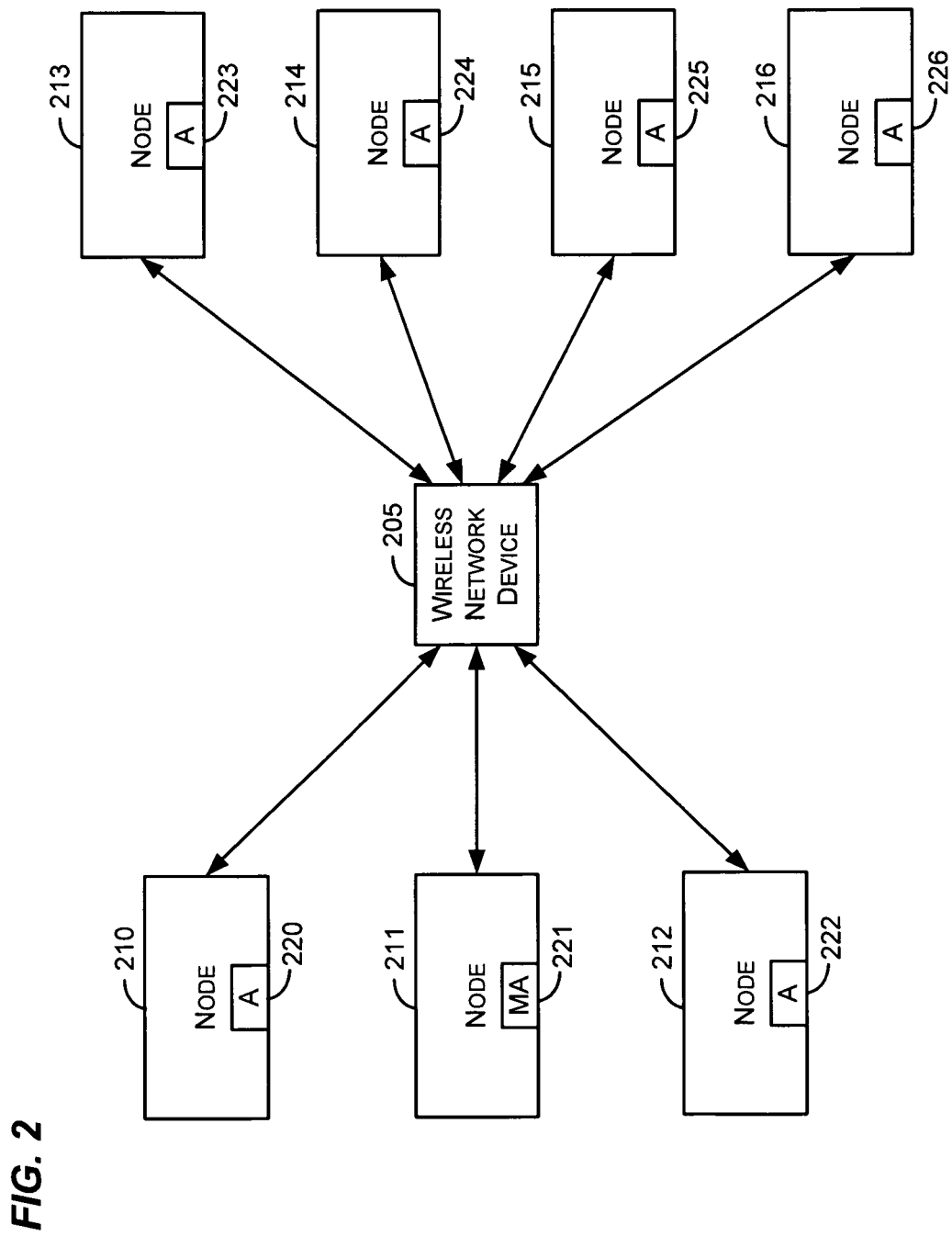
FIG. 2 is a block diagram representing an exemplary environment in which aspects of the subject matter described herein may be implemented.

As mentioned previously, changing wireless network security is cumbersome and error-prone. FIG. 2 is a block diagram representing an exemplary environment in which aspects of the subject matter described herein may be implemented. The environment includes a wireless network device 205 and nodes 210-216. Sometimes the wireless network device 205 and the nodes 210-216 are referred to as entities. The environment may also include other entities (not shown).

Where a line connects one entity to another, it is to be understood that the two entities may be connected via a wireless communication link. Over this wireless communication link, the two entities may communicate with each other. Although aspects of the subject matter described herein are described with reference to a wireless network, in other embodiments, aspects of the subject matter described herein may also be applied to wired networks and/or combinations of wired and wireless networks.

Each of the nodes 210-216 may be implemented on or as one or more computers (e.g., the computer 110 as described in conjunction with FIG. 1). Typically, the wireless network device 205 may be implemented as a stand-alone special purpose device such as a router, switch, and the like, although in some embodiments, the wireless network device 205 may be implemented on or as one or more computers (e.g., the computer 110 as described in conjunction with FIG. 1).

Each of the nodes 210-216 may include an agent 220-226, respectively. Each agent may comprise one or more software and/or hardware modules that are installed on its corresponding node. The agents may be used when switching the wireless mode of the wireless network device 205. For example, when the wireless network device 205 switches from a non-secured to a secured wireless protocol, the agents may be utilized to seamlessly allow the nodes 210-216 to begin communicating with the wireless network device 205 via the new secured wireless protocol as will be described in more detail below.

As an overview of the process of changing modes, a user indicates that the user wants to have the security mode of the wireless network device 205 changed. After this occurs, a master agent is selected. Any of the agents 220-226 may become the master agent. The process of selecting a master agent may use any of many well known selection algorithms that include logic for selecting a single entity from a group of entities. Some exemplary selection algorithms include election, selection by a user, selection of the device a user is interacting with, random selection, determination by a server servicing the network, and the like.

Once a master agent is selected, the master agent signals to the other agents that the process of changing networks modes has begun. It can be assumed that the master agent and the other agents can authenticate each other and can also communicate with each other securely (e.g., using encryption). The master agent detects all active nodes that have agents installed. The master agent then stores a snapshot of the wireless access device's current settings. These settings may be used in a roll-back scenario if the changing of network modes is not successful.

Each agent lets the master agent know which network modes the agent supports. As is known in the art, there are many different protocols for accessing a network. Some nodes may not be able to support every protocol, old protocols, or new protocols. Each agent also stores a snapshot of its current connection settings. This may be used in a roll-back scenario.

The master agent determines to which network mode the wireless access device will be switched. This may be determined based on the most secure mode that all nodes are capable of supporting, administrator settings, other policy, and the like. The master agent then generates a data structure that includes security settings needed to connect to the wireless access device once the network mode is changed. The data structure may comprise an XML file, configuration data placed in an object, or some other collection of data without departing from the spirit or scope of aspects of the subject matter described herein. This data structure is sent to each of the agents and/or a location accessible by each of the agents.

The master agent waits for acknowledgments from each of the agents that each agent has received the data structure. The master agent then applies the security changes. Each agent uses the data structure to configure its corresponding node to access the network access device. After a node has reconnected to the network access device, the agent sends an acknowledgment to the master agent that the node was able to reconnect using the new setting. The master agent waits for all of the agents to respond or until a timeout period elapses.

If all the agents have responded, the master agent sends acknowledgments to the agents to indicate that the change was successful. If the timeout period elapses, the master agent initiates a rollback of the network access device's settings. Each agent also reverts its corresponding node to the previous security settings. Once a node has reconnected, the agent sends a roll-back acknowledgment to the master agent.

If all roll-back acknowledgments are received by the master agent within a timeout period, the master agent sends acknowledgments to the other agents that the process is complete, but that the new security mode was not applied. Otherwise, the master agent generates an error which it may send to the other agents and/or other error reporting facilities.

Figure 3:
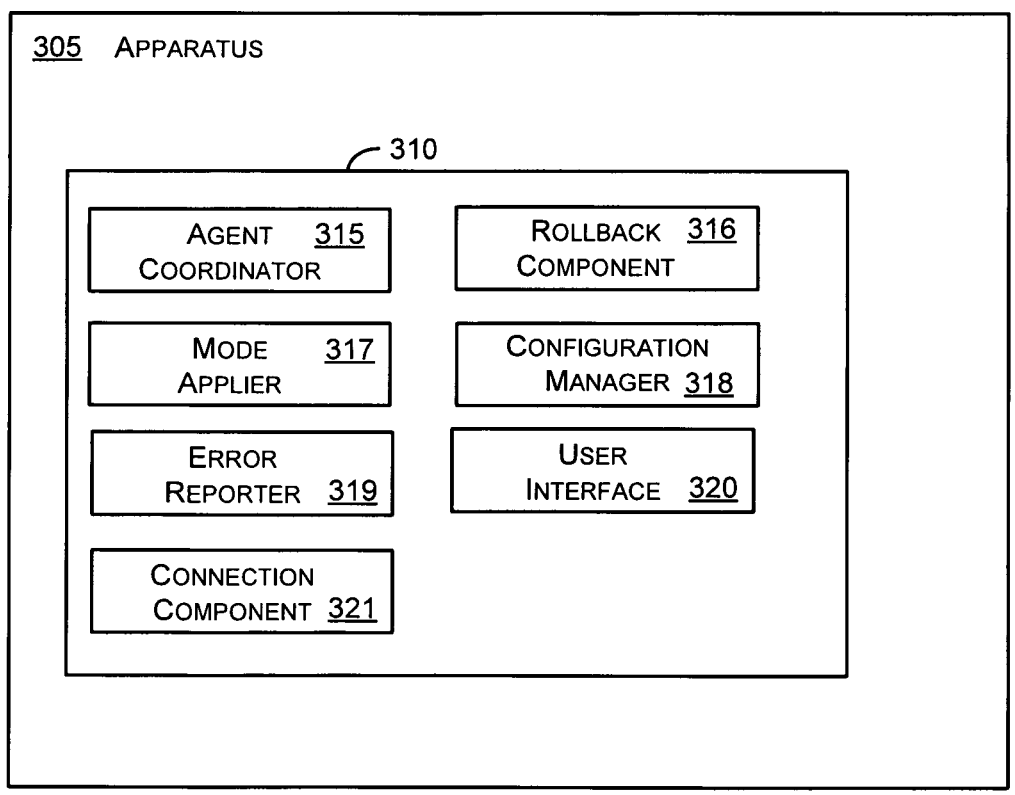
FIG. 3 is a block diagram illustrating various components that may be included in an apparatus arranged in accordance with aspects of the subject matter described herein.

FIG. 3 is a block diagram illustrating various components that may be included in an apparatus arranged in accordance with aspects of the subject matter described herein. The components illustrated in FIG. 3 are exemplary and are not meant to be all-inclusive of components that may be needed or included. In other embodiments, the components or functions described in conjunction with FIG. 3 may be included in other components or placed in subcomponents without departing from the spirit or scope of aspects of the subject matter described herein.

Turning to FIG. 3, the apparatus 305 may include agent components 310 which may comprise an agent coordinator 315, a rollback component 316, a mode applier 317, a configuration manager 318, and error reporter 319, and a user interface component 320, and a connection component 321.

The agent coordinator 315 may be operable to send and receive messages regarding changing network modes of a network device. In response to receiving capabilities from other agents, a master agent coordinator 315 may be operable to determine the capabilities supported by all nodes. The master agent coordinator 315 may also operate to determine whether acknowledgments have been received from the other agents.

The rollback component 316 may store a snapshot of current settings of a network device in case a rollback is performed.

The mode applier 317 may operate to apply a network mode to a network device. The mode applier 317 may do this automatically (e.g., in the case of enabled network devices), semi-automatically (e.g., with some user input), or manually (e.g., allowing the user to make the configuration change and indicate that the change is completed).

The configuration manager 318 may create a data structure that includes the characteristics of the new network mode. The configuration manager 318 may also configure the connection component 321 according to the characteristics so that the apparatus 305 may communication using the new network mode.

The error reporter 319 may provide notifications of errors and/or success. These notifications may be provided via the user interface component 320 and to nodes external from the apparatus 305.

The user interface component 320 may be used to interact with the agent components 310. The user interface component 320 may allow the user to indicate that the network mode is to be changed and may allow a user to specify the new mode of the network. The user interface component 320 may also be used to report successes and/or failures of the change in network modes.

The connection component 321 operates to connect to other nodes via the selected network mode. If encryption is needed, the connection component 321 may encrypt the messages as appropriate. If a password is to be supplied to a network device, the connection component 321 may supply the password, and so forth.

Figure 4:
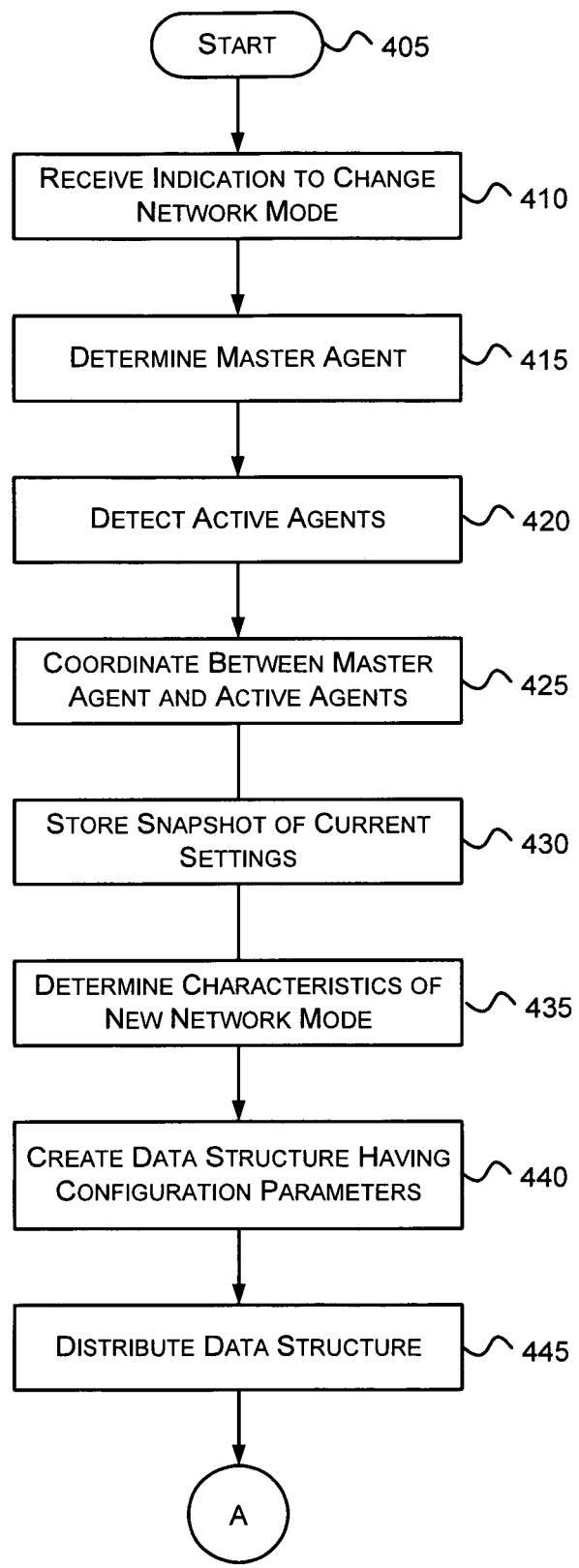
FIGS. 4-6 are flow diagrams that general represent actions that may occur in changing network modes in accordance with aspects of the subject matter described herein.
Figure 5:
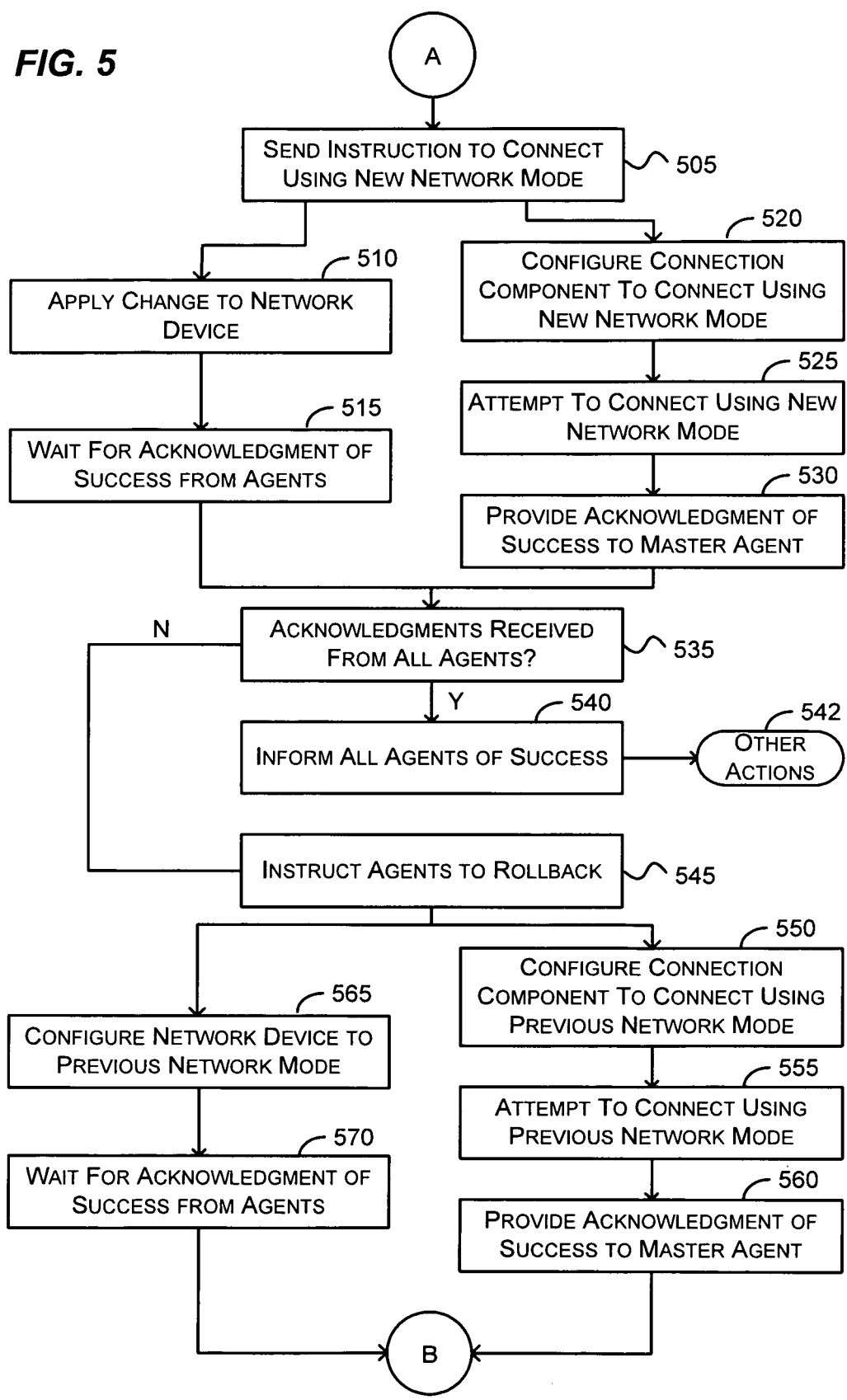
Figure 6:
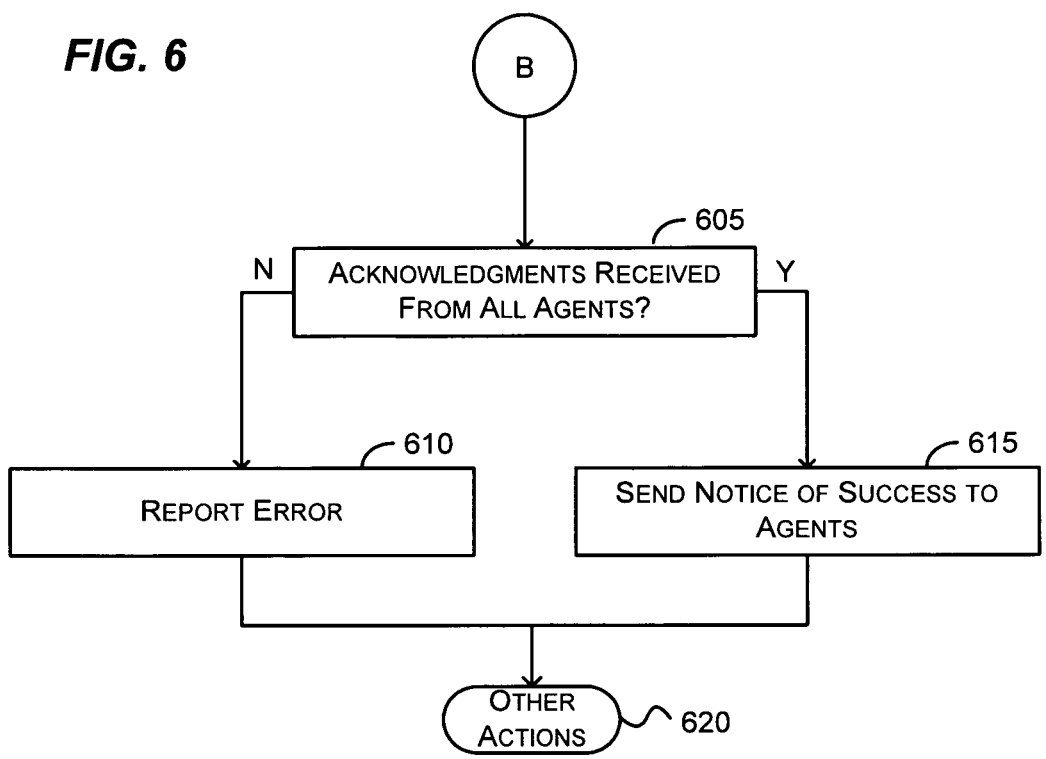

FIGS. 4-6 are flow diagrams that generally represent actions that may occur in changing network modes in accordance with aspects of the subject matter described herein. For simplicity of explanation, the methodology described in conjunction with FIGS. 4-6 are depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, an indication to change network modes is received. For example, referring to FIG. 3, a user indicates, via the user interface component 320, that a network access device (e.g., the wireless network device 205 of FIG. 2) is to be changed from a non-secured wireless networking mode to a secured wireless networking mode.

At block 415, a master agent is determined. For example, referring to FIG. 2, the agents 220-226 determine that the agent 221 is to be the master agent. As another example, the user may be physically interacting with the node 211 and this may be used as the selection criteria of the master agent.

At block 420, active agents are detected. For example, referring to FIG. 2, the master agent 221 sends a message and determines that the agents 220 and 222-226 are active.

At block 425, coordination between the master agent and the active agents occurs. Coordination may include the master agent signaling that a network mode change is commencing, communicating capabilities from agents to the master agent, acknowledgments, other actions, and the like.

At block 430, a snapshot of current settings is stored. For example, referring to FIG. 3, the rollback component 316 on both the master agent and other agents stores a snapshot of current settings for using the wireless network device 205 of FIG. 2.

At block 435, characteristics of the new network mode are determined. For example, in one embodiment, referring to FIG. 3, the master agent coordinator 315 determines the capabilities that are supported by all nodes. Capabilities may include the type of encryption supported, the number of bits in the encryption supported, wireless modes (e.g., B, G, N, etc.), platform information (e.g., OS, firmware, etc.), and the like.

In another embodiment, the master agent coordinator 315 may determine the new network mode based on a policy or an indication from a user. For example, a user or policy may indicate to switch to a network mode having particular characteristics even if those characteristics are not supported by all of the nodes on the network. As another example, a user or policy may indicate to switch to a particular type of security but that the number of bits used for encryption for the security be based on the capabilities supported by the nodes that support that type of security.

If a node does not support the new network mode, this will not cause an error or a rollback unless other nodes that do support the new network mode are unable to connect using the new network mode. A list of the nodes that do not support the new network mode may be provided to the user via a user interface or otherwise.

The examples above are not intended to be all-inclusive or exhaustive. Indeed, based on the teachings herein, it will be recognized that many other policies or indications from a user may be used to select a mode that is or is not supported by all the nodes without departing from the spirit or scope of aspects of the subject matter described herein.

At block 440, a data structure having configuration parameters usable to connect to the network device using the new network mode is created. For example, referring to FIG. 3, the configuration manager 318 creates a data structure that includes the characteristics of the selected new network mode. These characteristics may include encryption keys, passwords, bit lengths, and the like that are needed to connect to a network device using the new network mode.

At block 445, this data structure is distributed to the active agents. For example, referring to FIG. 2, the master agent 221 distributes this data structure to the agents 220 and 222-226. The actions continue at block 505 of FIG. 5.

Turning to FIG. 5, at block 505, the master agent sends an instruction to the other agents to connect using the new network mode. For example, referring to FIG. 2, the master agent 221, informs the other agents 220 and 222-226 to connect using the new network mode.

At block 510, the change is applied to the network device. For example, referring to FIG. 2, the master agent configures the wireless network device 205 to operate using the new network mode. In another embodiment, the wireless network device 205 is configured via another mechanism (e.g., via a Web interface, other interface, or the like) in a manual or semi-automatic manner.

At block 515, the master agent waits for acknowledgment of success from the other agents. For example, referring to FIG. 2, the master agent 221 waits for a period of time for the other agents to report success. If the period of time expires, the master agent 221 may commence rollback procedures.

At block 520, each agent configures a connection component to connect using the new network settings. An agent uses the configuration information included in the data structure previously received to configure the connection component. For example, referring to FIG. 3, an agent may use the configuration manager 318 to configure a connection component to connect using the new network settings.

At block 525, the agent attempts to connect using the new network mode. For example, referring to FIG. 2, the agent may attempt to communicate with a master agent using the agent coordinator 315 and the connection component.

At block 530, the agent sends an acknowledgment of success to the master agent. For example, referring to FIG. 2, each of the agents 220 and 222-226 that succeed send an acknowledgment of success to the master agent 221.

At block 535, the master agent determines if acknowledgments have been received from all of the other agents. For example, referring to FIG. 2, the master agent 221 determines if it has received acknowledgments from each of the agents 220 and 222-226.

At block 540, the master agent informs the other agents that the network mode has been successfully changed. For example, referring to FIG. 2, the master agent 221 informs the other agents 220 and 222-226 that the network mode was successfully changed.

At block 542, other actions (not shown) may be performed.

At block 545, the master agent instructs the other agents to rollback. For example, referring to FIG. 2, the master agent 221 informs the other agents 220 and 222-226 that they need to rollback to the previous network setting. Note that agents that the master agent 221 cannot contact may automatically rollback after a period of time elapses.

At block 550, each agent configures the connection component to connect to the network device using the previous network mode. For example, referring to FIG. 3, an agent may use the rollback component 316 to restore a connection component to its previous settings.

At block 555, the agent attempts to connect via the network device using the previous network mode. For example, referring to FIG. 2, each of the agents 220-226 attempts to connect to the network using the previous settings.

At block 560, agents provide acknowledgment of success to the master agent. For example, referring to FIG. 2, the agents 220 and 222-226 provide acknowledgment of success of connecting using the previous settings to the master agent 221.

At block 565, the master agent configures the network device to operate in the previous network mode. For example, referring to FIG. 2, the master agent 221 configures the wireless network device 205 to its previous network mode. In another embodiment, this reconfiguration may occur manually or semi-automatically with user input.

At block 570, the master agent waits for acknowledgment of success from agents. For example, referring to FIG. 2, the master agent 221 waits for acknowledgment of success from the other agents 220 and 222-226. After block 570, the actions continue at block 605 of FIG. 6.

Turning to FIG. 6, at block 605, the master agent determines whether it has received acknowledgments from all of the other agents. If so, the actions continue at block 615; otherwise, the actions continue at block 610. For example, referring to FIG. 3, the agent coordinator 315 may determine whether acknowledgments were received from all of the agents.

At block 610, the error is reported. For example, referring to FIG. 3, the error reporter 319 may indicate that an error has occurred. In doing this, the error reporter 319 may utilize the user interface component 320 and/or send a message to another node.

At block 615, notice of success is sent to the agents. For example, referring to FIG. 2, the master agent 221 sends notice of successful rollback to the agents 220 and 220-226.

At block 620, other actions (not shown) may be performed.

As can be seen from the foregoing detailed description, aspects have been described related to automatic configuration of network mode. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method performed on a computer of a plurality of computers, the method comprising:

receiving, by the computer from a user, an indication to change from a first security mode to a second security mode, where each of the plurality of computers is configured to communicate according to the first security mode over a wireless network via a wireless network device that is also configured to communicate according to the first security mode; where each of the plurality of computers includes an agent that is configured for obtaining and storing a snapshot of current security settings from the each agent's computer, where each snapshot is configured for use in a rollback operation initiated by a master agent, and where the rollback operation is configured for being performed on the each agent's computer, and is further configured for reverting the each agent's computer based on its snapshot to communicate over the wireless network via the wireless network device according to the first security mode;

designating the agent operating on the computer as a master agent that is configured for initiating the rollback operation;

determining, by the master agent, characteristics of the second security mode;

creating, by the master agent, a data structure including the characteristics of the second security mode and configuration parameters corresponding to the second security mode, where the data structure is configured for being used to enable each of the plurality of computers to be reconfigured to communicate over the wireless network via the wireless network device according to the second security mode;

sending, by the master agent, the data structure to each of the other agents;

reconfiguring, by the master agent, the wireless network device according to the data structure, where the reconfigured wireless network device is configured to communicate over the wireless network with the plurality of computers according to the second security mode;

instructing, by the master agent, the computers of the each of the other agents to connect to the wireless network via the reconfigured wireless network device according to the second security mode based on the sent data structures;

waiting a period of time, by the master agent in response to the instructing, to receive from each agent an acknowledgment indicating that the each agent connected to the wireless network according to the second security mode;

initiating, by the master agent in response to not receiving an acknowledgement from each agent within the period of time, the rollback operation, the initiating including reconfiguring, by the master agent, the wireless network device wherein the reconfigured wireless network device is configured to communicate over the network with the plurality of computers according to the first security mode, and that includes each agent reverting its computer, where each reverted computer is configured to communicate over the wireless network via the wireless network device according to the first security mode; and sending, by the master agent to each agent in response to receiving an acknowledgement from each agent, another acknowledgment that indicates that the change was successful.

2. The method of claim 1, further comprising storing, by the master agent, network connection settings of the wireless network device wherein the stored network connection settings correspond to the first security mode.

3. The method of claim 1, wherein the determining, by the master agent, characteristics of the second security mode comprises:

receiving, by the master agent and from each agent, communications that indicate capabilities of the computer corresponding to the each agent;

determining, by the master agent, common capabilities of the plurality of computer based on the capabilities of each of the plurality of computers; and determining, by the master agent, characteristics of the second security mode based on the common capabilities.

4. The method of claim 1, wherein the determining, by the master agent, characteristics of the second security mode comprises receiving user input that dictates the characteristics of the second security mode.

5. The method of claim 1, further comprising detecting the agents.

6. The method of claim 1, wherein the first security mode comprises a non-secure security mode and the second security mode comprises a secure security mode.

7. At least one computer storage device storing computer-executable instructions that, when executed by a computer of a plurality of computers, cause the computer to perform actions comprising:
- receiving, by the computer from a user, an indication to change from a first security mode to a second security mode, where each of the plurality of computers is configured to communicate according to the first security mode over a wireless network via a wireless network device that is also configured to communicate according to the first security mode; where each of the plurality of computers includes an agent that is configured for obtaining and storing a snapshot of current security settings from the each agent's computer, where each snapshot is configured for use in a rollback operation initiated by a master agent, and where the rollback operation is configured for being performed on the each agent's computer, and is further configured for reverting the each agent's computer based on its snapshot to communicate over the wireless network via the wireless network device according to the first security mode;
- designating the agent operating on the computer as a master agent that is configured for initiating the rollback operation;
- determining, by the master agent, characteristics of the second security mode;
- creating, by the master agent, a data structure including the characteristics of the second security mode and configuration parameters corresponding to the second security mode, where the data structure is configured for being used to enables each of the plurality of computers to be reconfigured to communicate over the wireless network via the wireless network device according to the second security mode;
- sending, by the master agent, the data structure to each of the other agents;
- reconfiguring, by the master agent, the wireless network device according to the data structure, where the reconfigured wireless network device is configured to communicate over the wireless network with the plurality of computers according to the second security mode;
- instructing, by the master agent, the computers of the each of the other agents to connect to the wireless network via the reconfigured wireless network device according to the second security mode based on the sent data structures;
- waiting a period of time, by the master agent in response to the instructing, to receive from each agent an acknowledgment indicating that the each agent connected to the wireless network according to the second security mode;
- initiating, by the master agent in response to not receiving an acknowledgement from each agent within the period of time, the rollback operation, the initiating including reconfiguring, by the master agent, the wireless network device wherein the reconfigured wireless network device is configured to communicate over the network with the plurality of computers according to the first security mode, and that includes each agent reverting its computer, where each reverted computer is configured to communicate over the wireless network via the wireless network device according to the first security mode; and
- sending, by the master agent to each agent in response to receiving an acknowledgement from each agent, another acknowledgment that indicates that the change was successful.

8. The at least one computer storage device of claim 7, the actions further comprising storing, by the master agent, network connection settings of the wireless network device wherein the stored network connection settings correspond to the first security mode.

9. The at least one computer storage device of claim 7, where the determining, by the master agent, characteristics of the second security mode comprises:
- receiving, by the master agent and from each agent, communications that indicate capabilities of the computer corresponding to the each agent;
- determining, by the master agent, common capabilities of the plurality of computer based on the capabilities of each of the plurality of computers; and
- determining, by the master agent, characteristics of the second security mode based on the common capabilities.

10. The at least one computer storage device of claim 7, where the determining, by the master agent, characteristics of the second security mode comprises receiving user input that dictates the characteristics of the second security mode.

11. The at least one computer storage device of claim 7, the actions further comprising detecting the agents.

12. The at least one computer storage device of claim 7, where the first security mode comprises a non-secure security mode.

13. The at least one computer storage device of claim 7, where the second security mode comprises a secure security mode.

14. A system comprising a computer and at least one program module that are together configured for performing actions, the computer of a plurality of computers, the actions comprising:
- receiving, by the computer from a user, an indication to change from a first security mode to a second security mode, where each of the plurality of computers is configured to communicate according to the first security mode over a wireless network via a wireless network device that is also configured to communicate according to the first security mode; where each of the plurality of computers includes an agent that is configured for obtaining and storing a snapshot of current security settings from the each agent's computer, where each snapshot is configured for use in a rollback operation initiated by a master agent, and where the rollback operation is configured for being performed on the each agent's computer, and is further configured for reverting the each agent's computer based on its snapshot to communicate over the wireless network via the wireless network device according to the first security mode;
- designating the agent operating on the computer as a master agent that is configured for initiating the rollback operation;
- determining, by the master agent, characteristics of the second security mode;
- creating, by the master agent, a data structure including the characteristics of the second security mode and configuration parameters corresponding to the second security mode, where the data structure is configured for being used to enables each of the plurality of computers to be reconfigured to communicate over the wireless network via the wireless network device according to the second security mode;

sending, by the master agent, the data structure to each of the other agents;

reconfiguring, by the master agent, the wireless network device according to the data structure, where the reconfigured wireless network device is configured to communicate over the wireless network with the plurality of computers according to the second security mode;

instructing, by the master agent, the computers of the each of the other agents to connect to the wireless network via the reconfigured wireless network device according to the second security mode based on the sent data structures;

waiting a period of time, by the master agent in response to the instructing, to receive from each agent an acknowledgment indicating that the each agent connected to the wireless network according to the second security mode;

initiating, by the master agent in response to not receiving an acknowledgement from each agent within the period of time, the rollback operation, the initiating including reconfiguring, by the master agent, the wireless network device wherein the reconfigured wireless network device is configured to communicate over the network with the plurality of computers according to the first security mode, and that includes each agent reverting its computer, where each reverted computer is configured to communicate over the wireless network via the wireless network device according to the first security mode; and sending, by the master agent to each agent in response to receiving an acknowledgement from each agent, another acknowledgment that indicates that the change was successful.

15. The system of claim 14, the actions further comprising storing, by the master agent, network connection settings of the wireless network device wherein the stored network connection settings correspond to the first security mode.

16. The system of claim 14, where the determining, by the master agent, characteristics of the second security mode comprises:

receiving, by the master agent and from each agent, communications that indicate capabilities of the computer corresponding to the each agent;

determining, by the master agent, common capabilities of the plurality of computer based on the capabilities of each of the plurality of computers; and determining, by the master agent, characteristics of the second security mode based on the common capabilities.

17. The system of claim 14, where the determining, by the master agent, characteristics of the second security mode comprises receiving user input that dictates the characteristics of the second security mode.

18. The system of claim 14, the actions further comprising detecting the agents.

19. The system of claim 14, where the first security mode comprises a non-secure security mode.

20. The system of claim 14, where the second security mode comprises a secure security mode.

* * * * *